United States Patent
Létal et al.

(10) Patent No.: US 10,320,823 B2
(45) Date of Patent: Jun. 11, 2019

(54) DISCOVERING YET UNKNOWN MALICIOUS ENTITIES USING RELATIONAL DATA

(71) Applicant: Cisco Technology, Inc., San Jose, CA (US)

(72) Inventors: Vojtěch Létal, Pardubice (CZ); Tomáš Pevný, Prague (CZ); Petr Somol, Marianske Lazne (CZ)

(73) Assignee: Cisco Technology, Inc., San Jose, CA (US)

( * ) Notice: Subject to any disclaimer, the term of this patent is extended or adjusted under 35 U.S.C. 154(b) by 411 days.

(21) Appl. No.: 14/844,379

(22) Filed: Sep. 3, 2015

(65) Prior Publication Data
US 2016/0337389 A1 Nov. 17, 2016

Related U.S. Application Data

(60) Provisional application No. 62/160,729, filed on May 13, 2015.

(51) Int. Cl.
*H04L 29/06* (2006.01)
*G06Q 50/00* (2012.01)

(52) U.S. Cl.
CPC ......... *H04L 63/1425* (2013.01); *G06Q 50/01* (2013.01); *H04L 63/0227* (2013.01); *H04L 63/1441* (2013.01)

(58) Field of Classification Search
CPC ............. H04L 63/0227; H04L 63/1425; H04L 63/1441; G06Q 50/01
See application file for complete search history.

(56) References Cited

U.S. PATENT DOCUMENTS

| | | | |
|---|---|---|---|
| 7,921,063 B1* | 4/2011 | Quinlan | G06F 17/20 706/12 |
| 8,291,495 B1* | 10/2012 | Burns | H04L 63/0254 455/410 |
| 8,631,489 B2 | 1/2014 | Antonakakis et al. | |
| 8,713,676 B2 | 4/2014 | Pandrangi et al. | |

(Continued)

OTHER PUBLICATIONS

Learning to detect malicious URLs; Justin Ma; Lawrence K. Saul; Stefan Savage; Geoffrey M. Voelker; ACM Transactions on Intelligent Systems and Technology (TIST) archive vol. 2 Issue 3, Apr. 2011 Article No. 30 ; pp. 1-24.*

(Continued)

*Primary Examiner* — Mohammad A Siddiqi
(74) *Attorney, Agent, or Firm* — Edell, Shapiro & Finnan, LLC

(57) ABSTRACT

Data is collected from a database arrangement about behavior of observed entities, wherein the collected data includes one or more features associated with the observed entities. A probabilistic model is determined that correlates the one or more features with malicious and/or benign behavior of the observed entities. Data is collected from the database arrangement for unobserved entities that have at least one common feature with at least one of the observed entities. One of the unobserved entities is determined to be a malicious entity based on the at least one common feature and the probabilistic model. Network policies are applied to packets sent from the malicious entity.

20 Claims, 8 Drawing Sheets

(56) References Cited

U.S. PATENT DOCUMENTS

| | | | | |
|---|---|---|---|---|
| 8,730,946 | B2* | 5/2014 | Mantripragada | ... H04L 65/1079 370/352 |
| 8,966,631 | B2* | 2/2015 | El-Moussa | ......... H04L 63/1425 709/223 |
| 9,032,531 | B1* | 5/2015 | Scorvo | ................... G06F 21/55 726/25 |
| 9,749,336 | B1* | 8/2017 | Zhang | .................... H04L 63/14 |
| 10,104,106 | B2* | 10/2018 | Langton | ............. H04L 63/1425 |
| 2006/0206935 | A1* | 9/2006 | Choi | ....................... G06F 21/55 726/22 |
| 2008/0022013 | A1 | 1/2008 | Adelman et al. | |
| 2008/0104101 | A1* | 5/2008 | Kirshenbaum | ... G06F 17/30539 |
| 2009/0216760 | A1* | 8/2009 | Bennett | ............ G06F 17/30864 |
| 2011/0023118 | A1* | 1/2011 | Wright | .................... G06F 11/28 726/23 |
| 2011/0247072 | A1* | 10/2011 | Staniford | ........... H04L 63/1416 726/24 |
| 2013/0268675 | A1* | 10/2013 | Tsai | .................... H04L 61/1511 709/226 |
| 2015/0101048 | A1* | 4/2015 | Sridhara | ................. G06F 21/55 726/23 |
| 2015/0319187 | A1* | 11/2015 | Huang | ............... H04L 63/1433 726/25 |
| 2015/0373039 | A1* | 12/2015 | Wang | ................. H04L 63/1425 726/23 |
| 2016/0065597 | A1* | 3/2016 | Nguyen | ............. H04L 63/1441 726/22 |
| 2016/0127407 | A1* | 5/2016 | Mankovskii | ....... H04L 63/1433 726/1 |
| 2018/0198805 | A1* | 7/2018 | Vejman | .............. H04L 63/1416 |

OTHER PUBLICATIONS

Wei Xu et al., "We Know It Before You Do: Predicting Malicious Domains", Virus Bulletin Conference, Sep. 2014, 5 pages.

Andrew G. West et al., "Metedata-driven Threat Classification of Network Endpoints Appearing in Malware", Verisign Labs, Reston, Virginia, USA, Detection of Intrusions and Malware, and Vulnerability Assessment, vol. 8550 of the series Lecture Notes in Computer Science, pp. 152-171, 20 pages.

Kevin M. Carter et al., "Probabilistic Threat Propagation for Malicious Activity Detection", Acoustics, Speech and Signal Processing (ICASSP), 2013 IEEE International Conference, Vancouver, BC, May 26-31, 2013, 5 pages.

Zhanyu Ma et al., "Bayesian Estimation of Beta Mixture Models with Variational Inference", IEEE, Stockholm 2011, IR-EE-SIP 2011:016, Apr. 5, 2011, 17 pages.

Mark Felegyhazi et al., "On the Potential of Proactive Domain Blacklisting", International Computer Science Institute, Berkeley, California, USA, LEET'10 Proceedings of the 3rd USENIX conference on Large-scale exploits and emergent threats: botnets, spyware, worms, and more, 2010, 8 pages.

Justin Ma et al., Beyond Blacklists: Learning to Detect Malicious Web Sites from Suspicious URLs, Department of Computer Science and Engineering, University of California, San Diego, KDD '09, Jun. 28-Jul. 1, 2009, Paris, France, 9 pages.

Audun Jøsang et al., "The Beta Reputation System", 15th Bled Electronic Commerce Conference, e-Reality: Constructing the e-Economy, Bled, Slovenia, Jun. 17-19, 2002, 14 pages.

\* cited by examiner

DISCOVERING YET UNKNOWN MALICIOUS ENTITIES USING RELATIONAL DATA

PRIORITY CLAIM

This application claims priority to U.S. Provisional Application No. 62/160,729, filed May 13, 2015, the entirety of which is incorporated herein by reference.

TECHNICAL FIELD

The present disclosure relates to network security, and in particular, detecting malicious entities.

BACKGROUND

Current Intrusion Detection Systems (IDS)/anti-malware solutions require a sample of malware (or an example of an attack vector) to be analyzed before a signature can be extracted and subsequently used to detect more instances of the analyzed attack type. This need to analyze known examples provides attackers with a delay between first discovery and effective remedy on the defender side if the attacker uses a new malicious entity (e.g., domain) not yet known to the defender as malicious.

DESCRIPTION OF EXAMPLE EMBODIMENTS

Overview

Data is collected from a database arrangement about behavior of observed entities, wherein the collected data includes one or more features associated with the observed entities. A probabilistic model is determined that correlates the one or more features with malicious and/or benign behavior of the observed entities. Data is collected from the database arrangement for unobserved entities that have at least one common feature with at least one of the observed entities. One of the unobserved entities is determined to be a malicious entity based on the at least one common feature and the probabilistic model. Network policies are applied to packets sent from the malicious entity.

DETAILED DESCRIPTION

Figure 1:
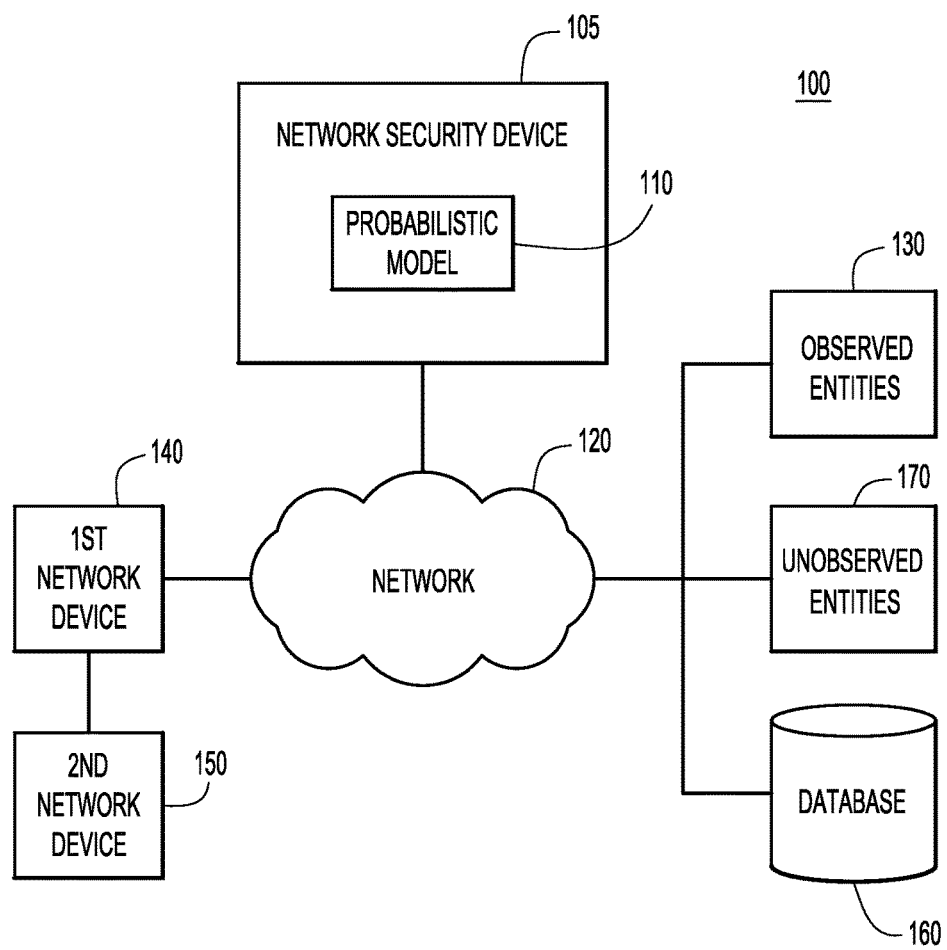
FIG. 1 illustrates a network environment configured to discover unknown malicious entities, according to an example embodiment.

With reference first made to FIG. 1, depicted therein is a network environment 100 configured to discover unknown malicious entities. Specifically, included in environment 100 is a network security device 105. Network security device 105 may be a network device such as a firewall, router, proxy or switch that is configured to apply network policies to network traffic. Network security device 105 utilizes probabilistic model 110 to discover malicious network entities (i.e., network domains) prior to traffic from these malicious entities being observed within network 120. Probabilistic model 110 may be built or generated based on observing the behavior of observed entities 130. While probabilistic model 110 is illustrated as residing at network security device 105, probabilistic model 110 may be generated and executed on another device, with the network security device 105 implementing network policies in response to predictions made by probabilistic mode 110.

Observed entities 130 may be considered "observed" because their traffic has been sent through network 120 to first network device 140 or second network device 150, and therefore, the malicious or benign nature of the traffic may be determined from the actual traffic. For example, the contents of network packets sent from observed entities 130 may be examined, or the results of the traffic being received by first network device 140 and/or second network device 150 may be observed. According to other examples, data from other network environments or other devices may be shared with network security device 105 that indicates whether or not observed entities are benign or malicious entities.

Once the malicious or benign behavior of observed entities 130 is known, the network security device 105 will generate probabilistic model 110 that correlates the malicious or benign behavior of observed entities 130 with features of the entities, referred to herein as "keys" associated with the entities. For example, the features or keys for particular entities may include email addresses associated with the entities, postal addresses associated with the entities, Internet Protocol (IP) addresses associated with the entities, organization names associated with the entities, and individuals associated with the entities, among others. These keys for the observed entities 130 may be retrieved from database 160. FIG. 1 illustrates a single database 160, but database 160 may include an arrangement of databases. For example, a first database of the arrangement may include data for observed entities, while a second database of the arrangement may include data for unobserved entities, as will be described in more detail below. Database 160 may be a publicly or commercially available database that associates entities with keys, such as the WHOIS database or a database of social network data. As would be understood by those skilled in the art, the WHOIS database is a database that stores the registered users or assignees of an Internet resource, such as a domain name, an IP address block, or an autonomous system, but is also used for a wider range of other information. Accordingly, the WHOIS database may be used to determine malicious network domains through the techniques described herein.

By examining the keys and the known malicious or benign behavior of observed entities 130, probabilistic model 110 may be generated and used to correlate the keys with benign or malicious behavior. Specific examples of generating probabilistic model 110 are described in greater detail below with reference to FIGS. 2-6. Once this correlation between specific keys and malicious or benign behavior is known, the malicious or benign behavior of unobserved entities 170 can be predicted from keys associated with unobserved entities 170 that are common to the keys of the observed entities 130. For example, if probabilistic model 110 indicates a strong correlation between a particular email address and malicious behavior by observed entities 130, unobserved entities 170 that also utilize the particular email address can be predicted to be malicious before any traffic from unobserved entities 170 is encountered or examined.

To implement probabilistic model 110 to predict the behavior of unobserved entities 170, data for unobserved entities 170 is collected from database 160. Specifically, data for unobserved entities 170 that includes keys that are common to observed entities 130 is retrieved from database 160. Because probabilistic model 110 correlates keys to malicious behavior, the keys for unobserved entities 170 may be used by probabilistic model 110 to predict the benign or malicious behavior of unobserved entities 170. Accordingly, when traffic (i.e., network packets) is sent from unobserved entities 170 to first network device 140 and/or second network device 150, security network connected device 105 can apply network policies to the traffic in response to the predictions made by probabilistic mode 110. For example, if probabilistic model 110 predicts that unobserved entities 170 are malicious, network security device 105 may proxy or block the traffic sent from unobserved entities 170.

According to other example embodiments, first network device 140 may be embodied as a firewall, switch, proxy, or router device, that applies policies to the packets of the network flows at the direction of network security device 105. Accordingly, first network device 140 applies policies to traffic sent to second network device 150 based on the determinations made by the probabilistic mode 110 generated by network security device 105.

Figure 2:
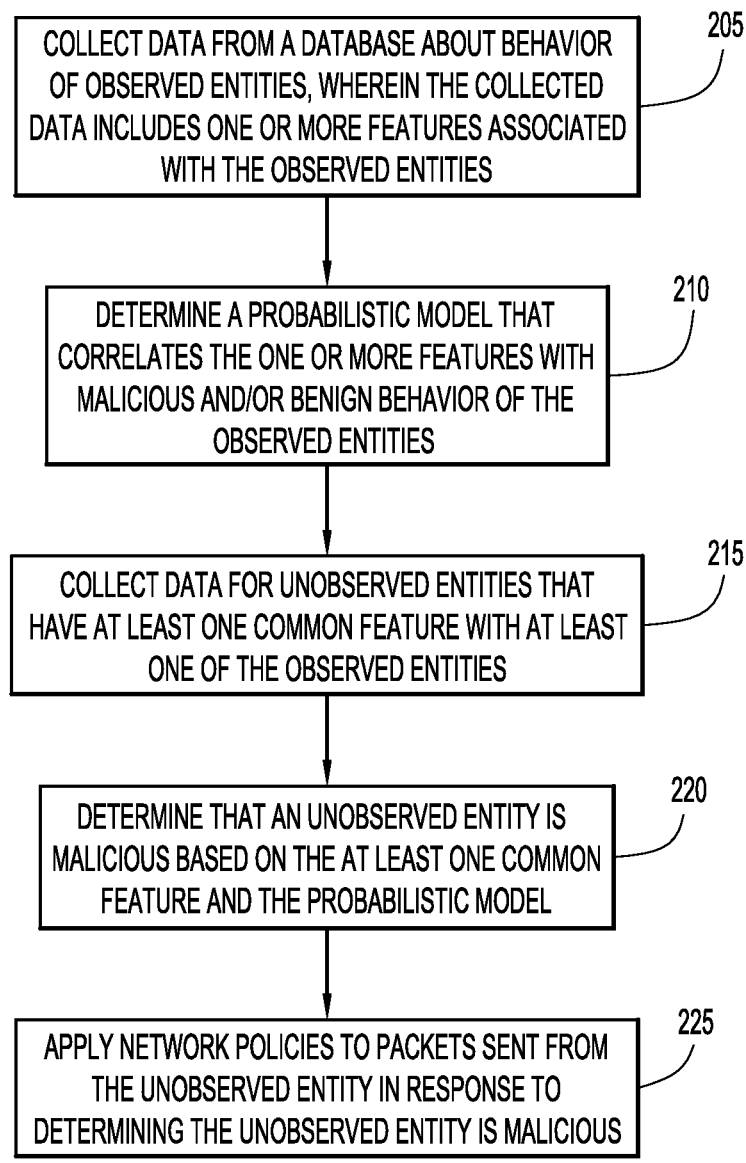
FIG. 2 is a flowchart illustrating a process for discovering unknown malicious entities based on relational data, according to an example embodiment.

With reference made to FIG. 2, depicted therein is a flowchart 200, illustrating a process capable of estimating the probability that a network entity or domain is malicious given its relationships to other network entities or domains. In other words, flowchart 200 illustrates a process for discovering yet to be known malicious entities using relational data. The process of FIG. 2 may be implemented by, for example, network security device 105 of FIG. 1 to generate probabilistic model 110 and apply network policies to traffic received from unobserved entities.

The process of flowchart 200 may estimate the probability that a domain and/or network entity is malicious based on its associated records in databases of network entity information, such as the WHOIS database. These database records may reveal a network entity's relationship to known malicious network domains and/or known malicious network entities. Even if traffic associated with these domains has not yet been seen by a security device, such as a firewall, proxy, router or switch, identified domains may be pre-registered as malicious so that the traffic associated with these domains may be processed appropriately as soon as it is encountered. Accordingly, the process illustrated in flowchart 200 allows for advance blacklisting of the previously unobserved malicious domains.

The process begins in operation 205 where data is collected from databases, such as the database arrangement 160 of FIG. 1. This data includes information regarding the behavior of observed entities. Also included in this data is at least one feature, i.e., "key", associated with the observed domain. As used herein, a feature or key is a piece of information that may differentiate two different entities from each other, but need not necessarily uniquely identify an entity. For example, if the entities being considered are persons, the feature may be a name, a social security number, an email address, a street address, an organization, or some other identifying piece of information. If the identity being considered is an organization, the feature may be a domain name, a uniform resource locator (URL), or an internet protocol (IP) address, among others.

The data collected in operation 205 may be collected from publicly or commercially available databases, including the WHOIS database, or databases of social network data. According to other examples, the database from which the data is collected in operation 205 may be a database of historical security information maintained by the entity providing network security. Similarly, data indicating whether or not an entity is malicious or benign may be collected from a database maintained by the entity providing network security, while the feature or key information may be collected from a publicly or commercially available database.

The data indicating the behavior of the observed entities is used to determine whether the entity should be considered to be malicious or benign. For example, if the data indicates that the entity has previously performed malicious actions, such as staging a Distributed Denial of Service (DDoS) attack, the entity may be identified as being malicious.

Operation 210 determines a probabilistic model that correlates the features contained in the collected data with malicious and/or benign behavior of the entities associated with the features. As will be described in greater detail with reference to the example embodiments of FIGS. 3-6, the probabilistic model indicates how predictive a particular feature is that the entity associated with the feature is malicious or benign. For example, if a particular email address is always associated with a malicious individual, that email address may be a feature that is strongly predictive that any entity associated with that email address is malicious. According to some examples, a Bayesian inference may be used when constructing the probabilistic model.

In operation 215, data associated with unobserved entities is collected. This data for the unobserved entities shares at least one feature that is common to the features previously collected for the observed entities. The data collected in operation 215 may be collected from a publicly or commercially available database, such as the WHOIS database, or databases of social network data. The database used in operation 215 may be the same or different from one or more of the databases used to collect data about observed entities in operation 205.

In operation 220, it is determined that one of the unobserved entities is malicious based on the at least one shared feature and the probabilistic model. Returning to the email address example discussed above, if an unobserved entity has an email address (i.e., a key) that the probabilistic model indicates as being strongly associated with observed malicious entities, it may be determined that unobserved entities also associated with that email address are also malicious.

In operation 225, network policies are applied to network packets sent from the malicious unobserved entity in response to the determination that the one of the unobserved entities is malicious. For example, the first time that network packets are received from an unobserved entity determined to be malicious by operation 220, the packets from the entity can be immediately blocked, proxied, or otherwise processed to account for the expected malicious nature of the domain.

In summary, the process of flowchart 200 builds the probabilistic model, the nature of observed entities/domains are determined, and features or keys are extracted from a repository or database arrangement, such as the WHOIS database, for the observed entities. Because these observed entities are known to be either malicious or benign, their features may be modeled based on this previous determination regarding the malicious or benign status of the previously observed entities. Once the observed entities are modeled, the database arrangement, e.g., the WHOIS database, can then be used to create a list of other previously unseen entities/domains with respective probabilities of maliciousness.

Continuing with the example of the WHOIS database, the more discriminative fields of the WHOIS records can be used as the keys for the probabilistic model. For example, the following information may be used as the features or keys for entities/domains:
- name
- organization
- email address
- postal address In other words, the process of flowchart 200 uses keys from relational (i.e., database) data to connect different domains or entities to each other. Connecting entities by their keys can reveal indirect relations between entities that seem to be otherwise unrelated. Such connected components can identify entities registered by a single malicious actor. If there is a domain in the WHOIS records that is registered to serve a malicious purpose but it has not been used yet, it can be revealed and blacklisted in advance. For example, a malicious entity may have multiple WHOIS entries. The same malicious entity may have multiple aliases, which will appear in the WHOIS database as separate entries, given the different names associated with the different entities. For the sake of convenience, this same malicious entity may use the same email address to register each of the aliases. Accordingly, the different WHOIS entries for the same malicious entity can be linked through the email address key in the WHOIS database. This email address will be correlated with malicious behavior based on actions by previously observed entities. Accordingly, unobserved domains with WHOIS entries that share this email address may be blacklisted based on the correlation of this email address with malicious behavior.

When used to apply network security to network domains, and using the WHOIS database, the process of flowchart 200 may involve the following steps:

Step 1—Collect data about the behavior of known observed domains.

Step 2—Assign each domain the keys extracted from its WHOIS record.

Step 3—Find other domains in the WHOIS database that share a common key with some of the observed domains.

Step 4—Learn the parameters of a probabilistic model, for example, learn the parameters for a model using a Variational Bayes method.

Step 5—Select a threshold based on the inferred probabilities to achieve a desired false positive rate.

Step 6—Identify domains with probabilities of maliciousness greater than the threshold, mark them as malicious, and apply network security policies to the traffic received from these domains, as necessary.

Domains labeled as malicious can then be used in an anomaly or intrusion detection system to blacklist potentially malicious domains.

Taking a more rigorous mathematical approach, the probabilistic model as determined in operation 210 of FIG. 2, may be defined as follows:

$$p(d|m_s,s) \sim Bi(m_s)$$

and $$p(m_s|s) \sim \text{Beta}(a_{K_s}, b_{K_s}).$$

where $p(d|m_s,s)$ is the probability that a malicious activity is detected given the maliciousness $m_s$ of the entity s, which following the binomial distribution Bi. The expression $p(m_s|s)$ is the prior probability of the maliciousness $m_s$, which follows the Beta distribution with parameters $a_{K_s}$, $b_{K_s}$. The parameters $a_{K_s}$, $b_{K_s}$ are functions of the keys of entity s. The idea is that each key k has its own values $a_k$ and $b_k$, which determine the probability distribution of maliciousness of the key k, defined as $$p(m_k|k) \sim \text{Beta}(a_k, b_k)$$

In order to obtain the probability distribution $p(m_s|s)$, the hyper parameters $a_{K_s}$, $b_{K_s}$ are calculated as a product of the partial parameters $a_k$, $b_k$ for all $k \in K$ as $$a_k = \prod_{k \in K} \alpha_k.$$

In other words the value of $m_s$ quantifies a confidence about maliciousness of the entity s. The Binomial and Beta distributions defined above are special cases of Multinomial and Dirichlet distributions, respectively. Though, the approach as described herein is not limited to those special cases.

To complete the model another prior is introduced to the values $a_k$ and $b_k$ for all keys k. This allows a strength of the Beta priors to be set, a priori. The priors are:

$$p(a_k) \sim \text{Gamma}(u_a, v_a),$$

and $$p(b_k) \sim \text{Gamma}(u_b, v_b),$$

which both follow Gamma distribution rules and are set to be the same for all keys k. Therefore, the values u and v are the parameters of the model that are tuned. The Gamma prior was selected because it has been shown that under certain approximations it is a conjugate prior to the Beta distribution.

All posterior probabilistic distributions have well defined parametric forms. Both of the priors are selected such that they are conjugate to the posteriors. The conjugates are used in Variational Bayes approach to learn the parameters.

After the inference is done, the model can be queried to give a probability of maliciousness of both previously seen and unseen entities as long as the entities share at least some keys in common with some of the observed entities used to generate the probabilistic model. A strength of this approach is that it is purely probabilistic, and the variables have well defined, understandable meanings.

The techniques described herein also provide a measure of confidence of the inferred assessment. In other words, the techniques described herein focus on estimating the probability $m_s$ that an entity s is malicious, and also on a confidence level of that determination. In order to infer maliciousness and an associated confidence level, a prior distribution of maliciousness, $m_s$, needs to be created. This prior distribution is a Beta distribution, which may be a standard conjugate prior for the binomial distribution of maliciousness, $m_s$. This standard conjugate prior allows for the learning of the parameters of the observed entities that lead to a maliciousness, $m_s$.

The model can be directly used as a classifier of entities into malicious or benign classes by thresholding the inferred probability. Specifically, a numerical value is determined to serve as a threshold for determining whether or not an entity is malicious. If the probability p for a domain d exceeds the threshold, the domain d is determined to be malicious. The threshold value can be set to result in a desired false positives rate, as will be described in greater detail below with reference to FIGS. 6A and 6B.

Figure 3:
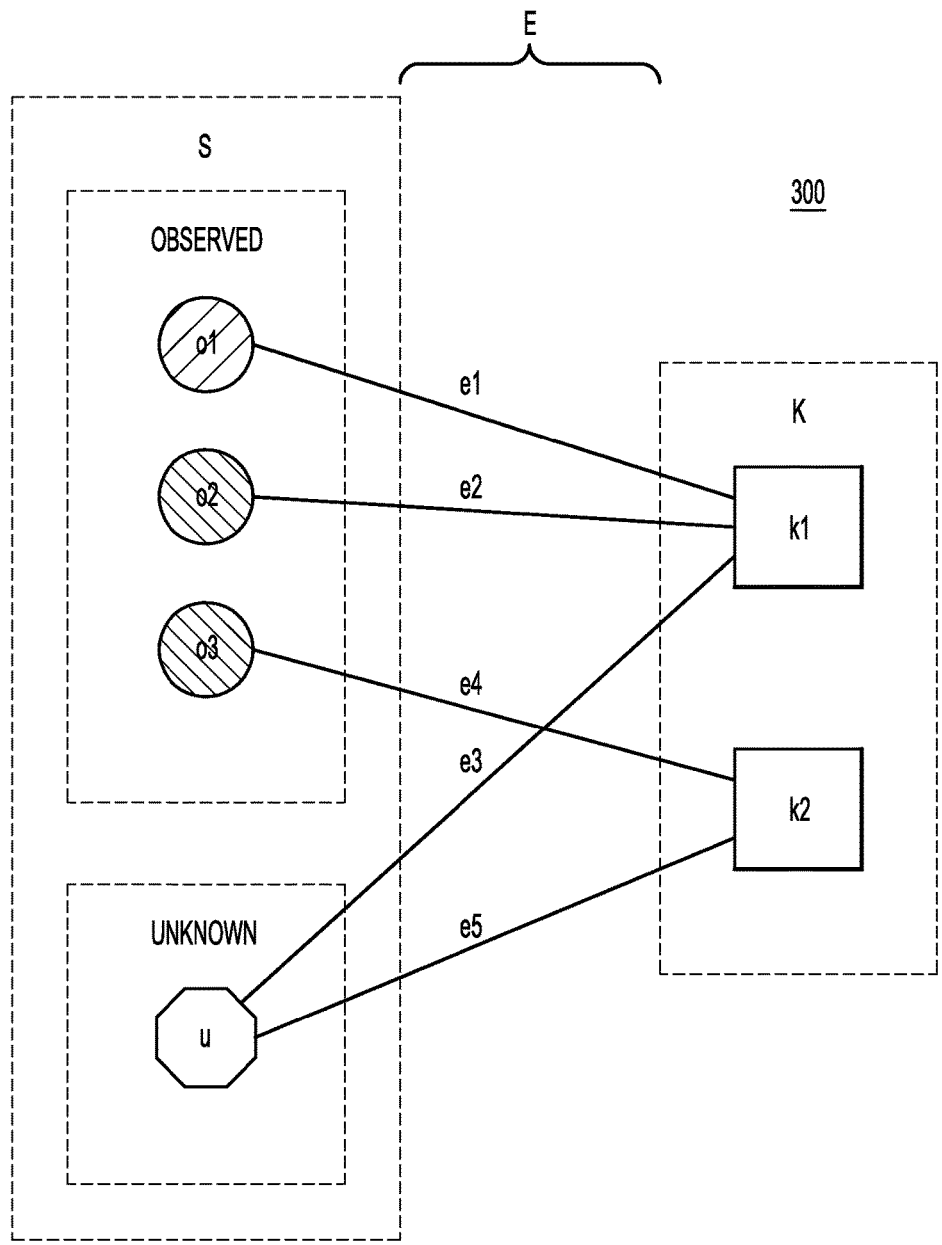
FIG. 3 is a bipartite graph illustrating relationships between network entities and keys associated with the network entities that may be utilized to discover yet unknown malicious entities, according to an example embodiment.

With reference now made to FIG. 3, depicted therein is visual representation 300 of a probabilistic model like that determined in operation 210 of FIG. 2. Specifically, visual representation 300 is a bipartite graph illustrating the use of a Bayesian inference to determine that an unobserved domain is malicious.

Bipartite graph 300 can be defined as follows:

$$G=(S,K,E),$$

where G represents the bipartite graph, S is a set of entities O1, O2, O3 and U; K is a set of keys K1 and K2, and E is a set of edges E1, E2, E3, E4, and E5. There is an edge between an entity in S and a key in K if that the entity has the key in K. Accordingly, entity O1 has the key K1, entity O2 has the key K1, entity O3 has the key K2, and the entity U has the keys K1 and K2, as illustrated through edges E1, E2, E3, E4, and E5, respectively.

The entities E of FIG. 3 have been split into two disjoint groups "Observed" and "Unknown." The first group "Observed" consists of entities which, as its name suggests, have been observed. In FIG. 3, these entities are entities O1, O2 and O3. Because entities O1, O2 and O3 have been observed, information about their malicious/benign behavior is known. Based on the observed information, it has been determined that entity O1 is benign, as illustrated by its light shading, while entities O2 and O3 are malicious, as illustrated by their dark shading. The group "Unknown" consists of entities which have not been observed. This group consists of entity U. Because U has not been observed, its maliciousness cannot be directly determined. Instead, whether or not U is malicious or benign may be determined through an inference based on the keys K. For example, entity U in FIG. 3 is more likely to be malicious than benign because it is related to two other malicious entities, O2 and O3, but only one legitimate entity, O1. Specifically, unknown entity U shares keys with two malicious entities, key K1 with malicious entity O2 and key K2 with malicious entity O3, but only one key, K1 with benign entity O1. Accordingly, when traffic is eventually received from entity U, it may be treated in similar fashion to traffic received from observed entities O2 and O3. For example, the same network polices that are applied to traffic received from entities O2 and O3 may be applied to traffic received from entity U.

Figure 4:
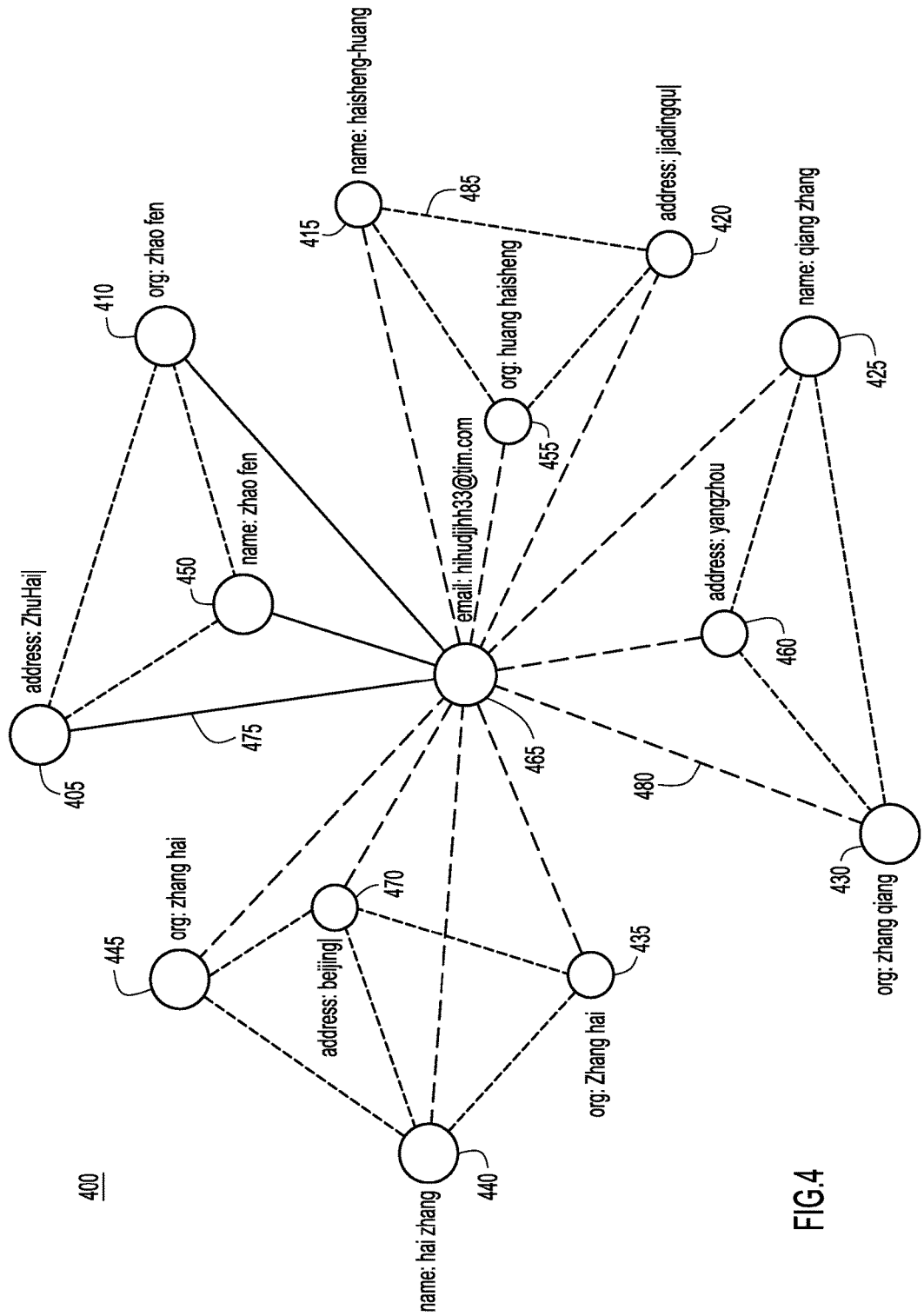
FIG. 4 is a cluster graph illustrating relationships between network entities and keys associated with the network entities that may be utilized to discover yet unknown malicious entities, according to an example embodiment.

With reference now made to FIG. 4, depicted therein is an example of a cluster graph 400 constructed from relational data, such as data retrieved from the WHOIS database. The nodes 405-470 of graph 400 illustrate the keys derived from the database data, not domains and/or entities. The number of entities associated with each key is illustrated through the size of the circle used to illustrate each node 405-470. There is an edge between two keys i, j if there exists any domain or entity d that has both keys i and j in its WHOIS record. The length of the dashes of each edge indicates how many domains/entities share the keys connected by the edge. For example, solid edge 475 may indicate that 10 entities share the keys associated with nodes 405 and 465. Long dashed edge 480 may indicate that 5 entities share the keys associated with nodes 430 and 465, while short dashed edge 485 may indicate that only one domain shares the keys associated with nodes 415 and 420.

Figure 5:
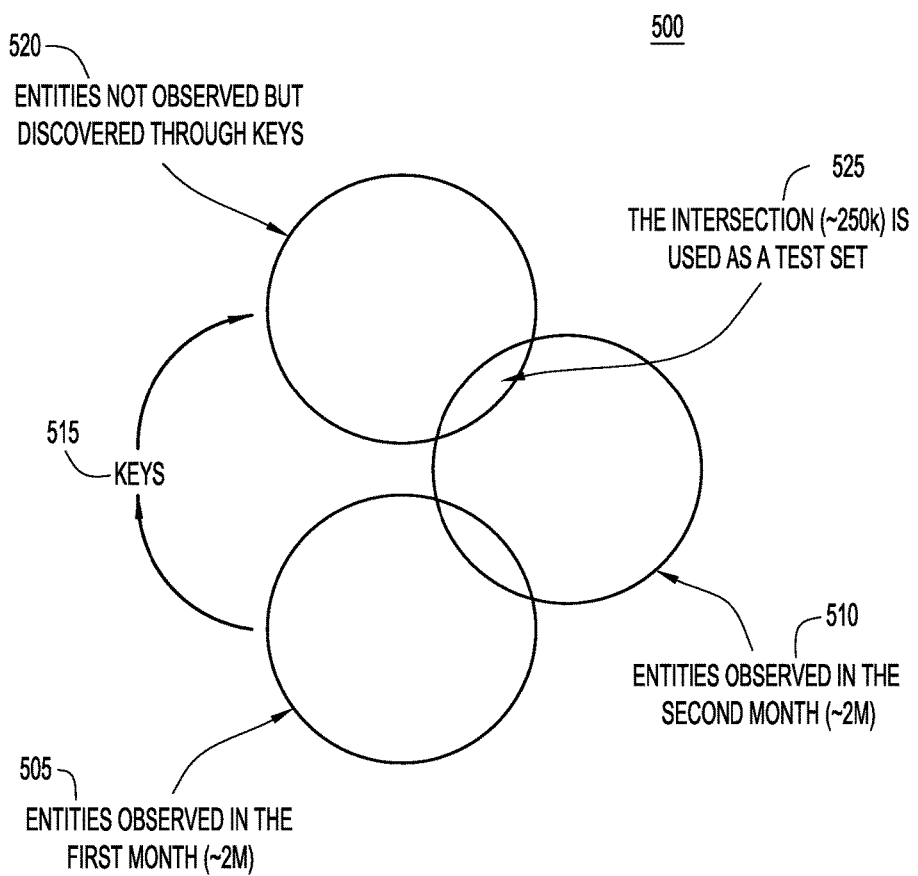
FIG. 5 is a Venn diagram illustrating data sets used to confirm the validity of the techniques described herein, according to an example embodiment.

With reference now made to FIG. 5, depicted therein is a Venn diagram which illustrates traffic flows from two subsequent time windows in accordance with an embodiment." In this diagram, data from a first month of Internet traffic was used to generate a probabilistic model. The entities included in this traffic are illustrated in circle 505 of Venn diagram 500. Data from a second month of Internet traffic was gathered, as illustrated by circle 510 of FIG. 5. Data from unobserved domains was gathered from the WHOIS database using the keys 515 that were derived from first month's data 505. This data is illustrated in circle 520 of FIG. 5.

The probabilistic model created from the first month's data (i.e., circle 505) was used to predict the behavior of the domains contained in the second month's data. In particular, the overlap 525 was used as a test data set for the probabilistic model generated from the first month's data 505. Overlap data 525 included observed data, as it is contained in the second month data of circle 510. Overlap 525 is also included in unobserved data 520. Accordingly, when the probabilistic model was applied to the unobserved data in 520, the predicted results for overlap 525 could be compared with the actual observed behavior for overlap 525 to determine how accurately the probabilistic model actually predicts the behavior of unobserved data. The results of the tests are illustrated in FIGS. 6A and 6B.

Figure 6A:
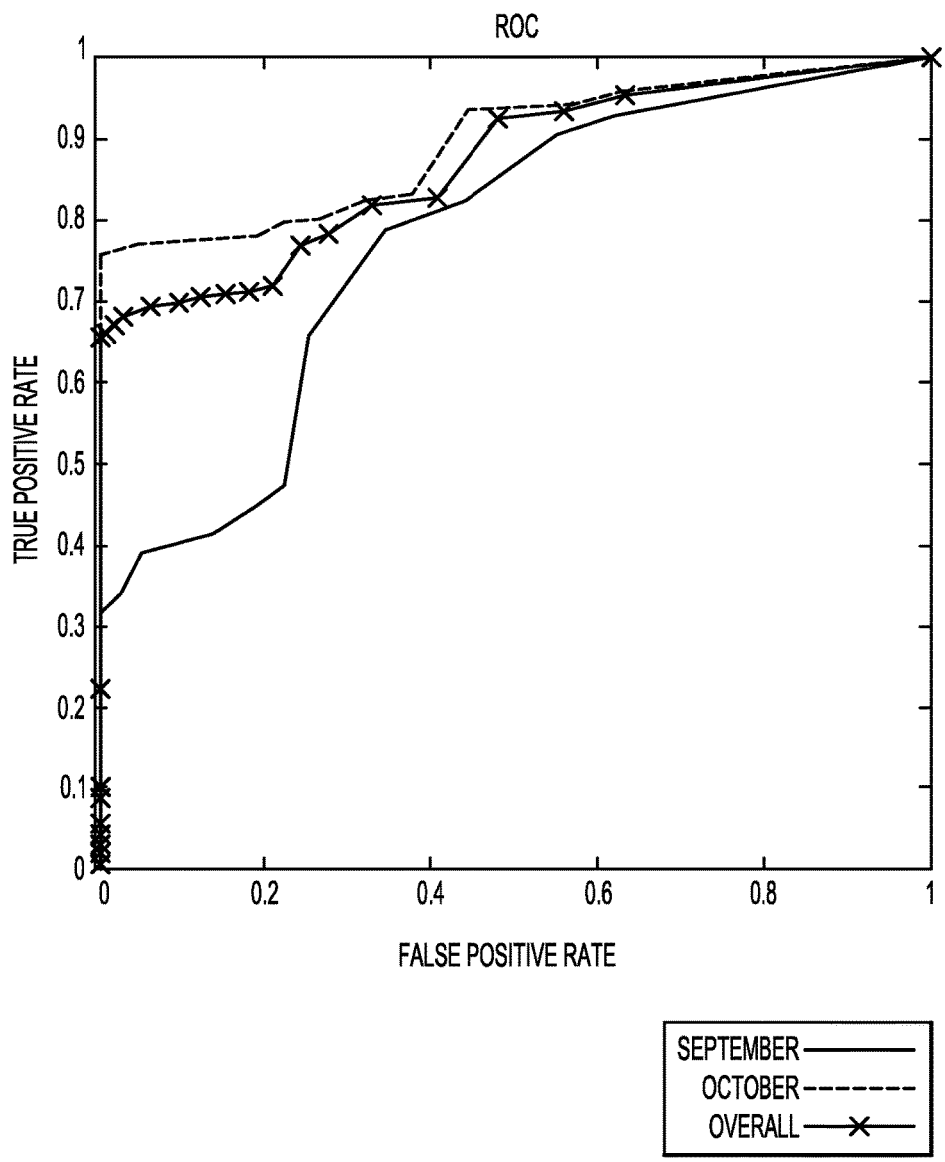
FIGS. 6A and 6B are graphs illustrating the validity of the techniques described herein, according to an example embodiment.
Figure 6B:
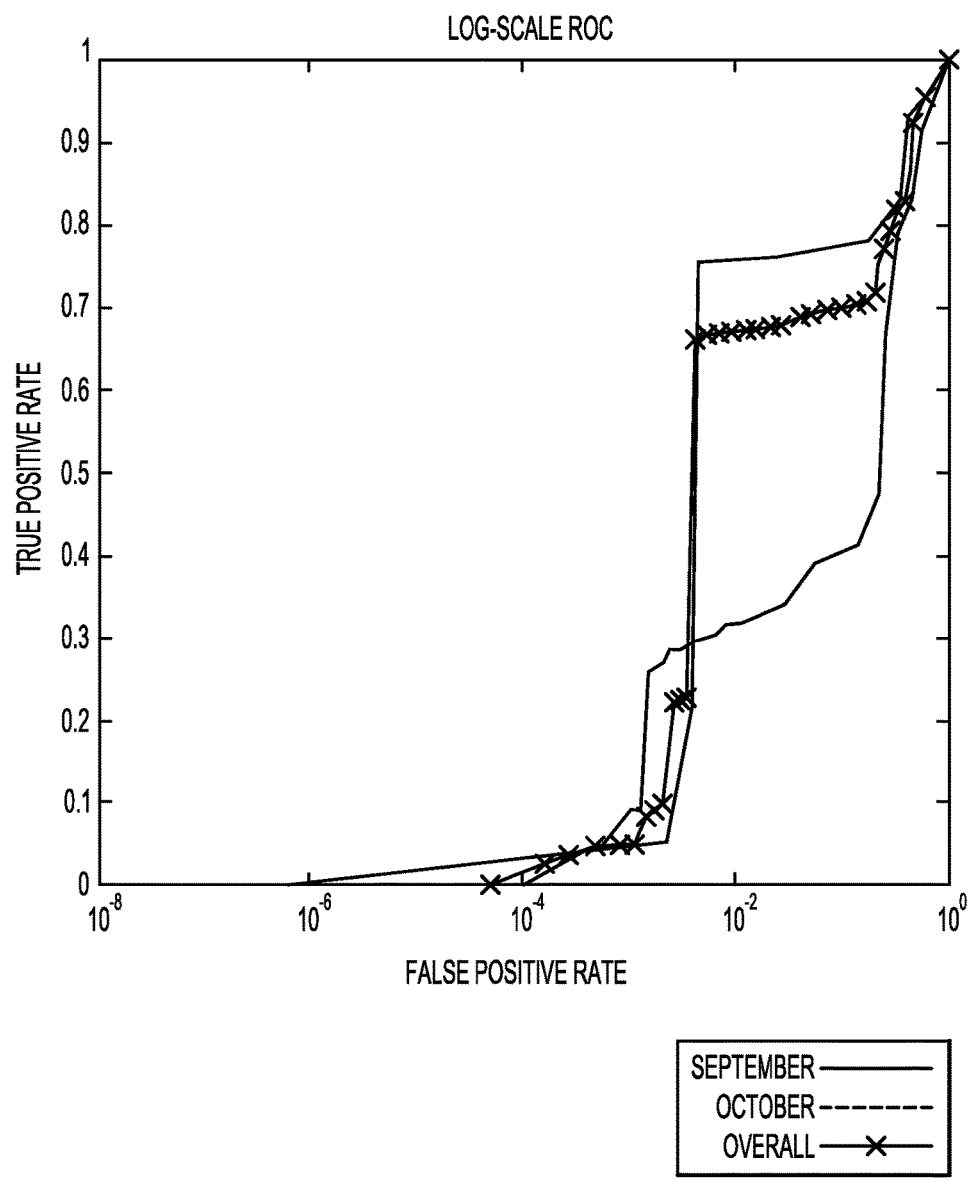

In FIGS. 6A and 6B, performance evaluations of the techniques described herein are illustrated using linear and logarithmic scales, respectively. The curves were constructed by varying the threshold on the inferred probability and classifying the flows into malicious or benign classes. The solid curve is the performance of a classifier trained on September 2014 and evaluated on October 2014 data. The long dashed curve is the result evaluated on October 2014 and tested on November 2014 data. The data covers approximately 2,000,000 unique domains in 150,000,000 flows, collected from 85 companies. The curve with "X" markers is an average performance on the two sets of data. As illustrated, with a false positive rate on the order of $10^{-3}$, the techniques described herein correctly predict 20-60% of previously unseen malicious domains.

Accordingly, as illustrated in FIGS. 6A and 6B, by modifying the threshold value for which a particular domain is determined to be malicious, an acceptable false positive rate can be achieved for the probabilistic model. Depending on the level of security required for a particular network, the threshold level may be set to favor false positives or false negatives.

Figure 7:
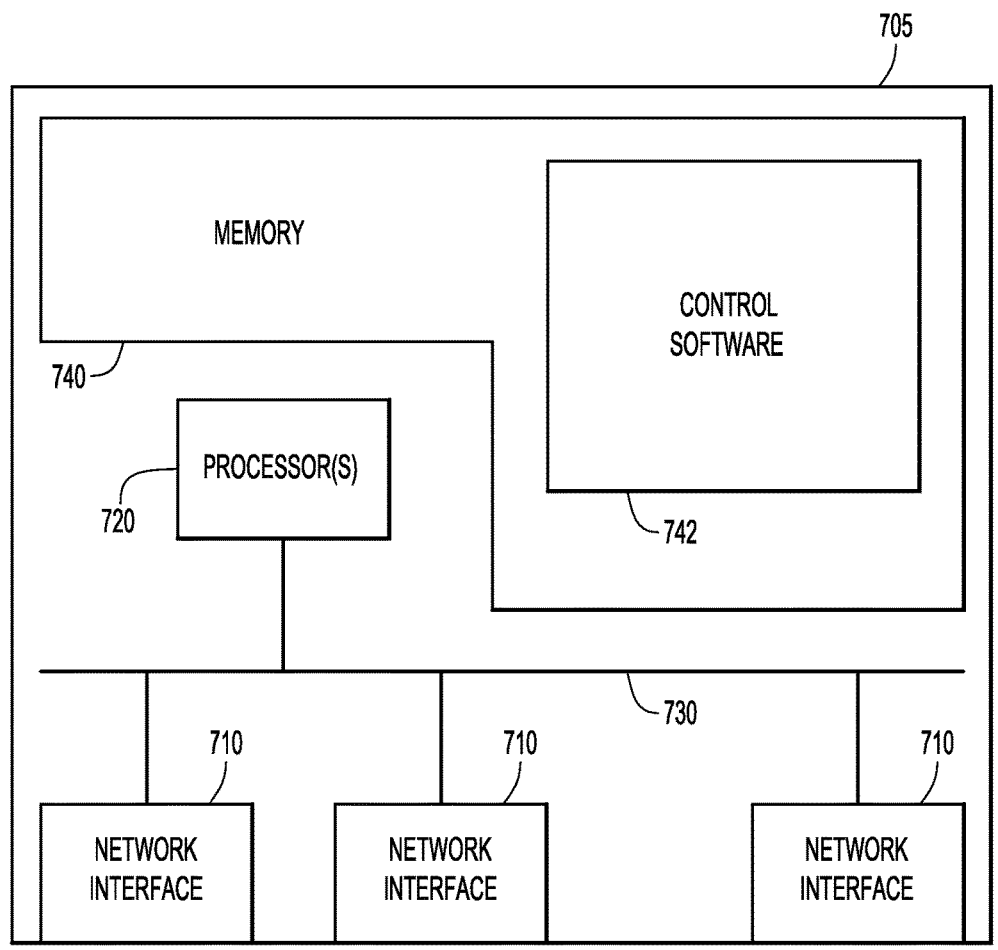
FIG. 7 is a block diagram of a device configured to discover unknown malicious entities using relational data, according to an example embodiment.

With reference now made to FIG. 7, depicted therein is a block diagram of a device 705 configured to perform the techniques described herein. Device 705 is illustrated as an example block diagram. Device 705 includes network interfaces (e.g., network ports) 710 which may be used to receive and send packets over a network. Accordingly, network interfaces 710 may be embodied as wired interfaces, wireless interfaces, optical interfaces, electrical interfaces, or a combination thereof. Device 705 is provided with one or more processors 720 to coordinate and control device 705. The processor 720 is, for example, one or more microprocessors or microcontrollers, and it communicates with the network interfaces 710 via bus 730. Memory 740 stores software instructions 742 which may be executed by the processor 720. For example, control software 742 for device 705 includes instructions for performing the discovery of unknown malicious entities using relational data, as described above. Accordingly, memory 740 includes instructions for device 705 to carry out the operations described above.

In other words, processor 720 is configured to collect data about the behavior of known or observed entities and store this data in memory 740. The data is collected from relational sources, such as databases. The collected data may include features associated with network domains known to be malicious and/or benign. From this collected data and observed behavior of the known entities, processor 720 generates a probabilistic model in which the features are correlated with the malicious or benign behavior of the known or observed entities. Once the probabilistic model is generated, processor 720 collects data for unobserved entities that share at least one feature common to at least one of the observed entities. Based on the at least one shared feature and the probabilistic model, processor 720 determines whether or not the unobserved entities are malicious. If the unobserved entities are determined to be malicious, processor 720 applies appropriate network policies to the unobserved entities, such as blocking network flows originating from unobserved entities. According to some example embodiments, device 705 may directly apply the policies to the network flows as the packets associated with the flows traverse the network.

Memory 740 may comprise read only memory (ROM), random access memory (RAM), magnetic disk storage media devices, optical storage media devices, flash memory devices, electrical, optical, or other physical/tangible memory storage devices. Thus, in general, memory 740, and control software 742 in particular, may comprise one or more tangible (non-transitory) computer readable storage media (e.g., a memory device) encoded with software comprising computer executable instructions and when the software is executed (by processor 720) it is operable to perform the operations described herein.

Therefore, also described herein are tangible, non-transitory, computer readable media encoded with instructions that when executed by a processor cause the processor to carry out the techniques described herein. Specifically, the instructions cause the processor to collect data about the behavior of known observed entities, and store this data in a memory. The data is collected from relational sources, such as databases. The collected data may include features associated with the network entities. The instructions further cause the processor to generate a probabilistic model from the collected data and observed behavior of the known entities that correlates the features with the malicious or benign behavior of the observed entities. Once the probabilistic model is generated, the instructions cause the processor to collect data for unobserved entities that share at least one feature common to at least one of the observed entities. Based on the at least one shared feature, the instructions cause the processor to determine whether or not one of the unobserved entities is malicious. If one of the unobserved entities is determined to be malicious, the instructions cause the processor to apply appropriate network policies to the entity, such as blocking network flows associated with the entity determined to be malicious.

In summary, the techniques described herein provide methods for discovering yet unknown malicious entities using relational data. The methods include collecting data about behavior of known observed entities. The data is collected from relational sources, such as databases. The collected data may include features associated with the network entities. From this collected data and observed behavior of the known entities, a probabilistic model is determined in which the features are correlated with the malicious or benign behavior of the observed entities. Once the probabilistic model is generated, data is collected for unobserved entities that share at least one feature common to at least one of the observed entities. Based on the at least one shared feature, a determination is made as to whether or not one of the unobserved entities is malicious. If one of the unobserved entities is determined to be malicious, the entity has appropriate network policies applied to it, such as blocking network flows associated with the entity determined to be malicious.

The above description is intended by way of example only. Various modifications and structural changes may be made therein without departing from the scope of the concepts described herein and within the scope and range of equivalents of the claims.

What is claimed is:

1. A method comprising:
   collecting data from a database arrangement about behavior of observed entities observed operating in a network, wherein the collected data includes one or more features associated with the observed entities;
   generating a probabilistic model that correlates features with malicious and/or benign behavior of the observed entities;
   collecting data from the database arrangement for unobserved entities that have not been observed operating in the network and that have at least one common feature with at least one of the observed entities;
   generating, from the probabilistic model, a numerical confidence level that one of the unobserved entities is a malicious entity prior to receiving packets sent from the one of the unobserved entities;
   determining a numerical threshold for the probabilistic model such that a deviation of the numerical confidence level from the numerical threshold is indicative that the one of the unobserved entities is malicious;
   determining from the probabilistic model that the one of the unobserved entities is a malicious entity;
   including the one of the unobserved entities as a malicious entity on a blacklist prior to receiving the packets sent from the one of the unobserved entities; and
   applying network policies to the packets sent from the one of the unobserved entities based upon the blacklist.

2. The method of claim 1, further comprising determining an acceptable false positive rate at which the probabilistic model will falsely identify benign entities as malicious entities, and setting the numerical threshold to a value to achieve the acceptable false positive rate.

3. The method of claim 1, wherein collecting data from the database arrangement for unobserved entities comprises collecting data from a database of social networking data.

4. The method of claim 1, wherein collecting data from the database arrangement for unobserved entities comprises collecting data from a WHOIS database.

5. The method of claim 1, wherein applying network policies to the packets comprises blocking network packets sent by the malicious entity.

6. The method of claim 1, wherein determining from the probabilistic model that the one of the unobserved entities is a malicious entity comprises:
   determining that the one of the unobserved entities shares one or more features with one or more observed malicious entities;
   determining that the one of the unobserved entities shares one or more features with one or more observed benign entities; and
   determining that the one of the unobserved entities is the malicious entity by comparing the one or more features shared with the one or more observed malicious entities to the one or more features shared with the one or more observed benign entities.

7. The method of claim 6, wherein comparing the one or more features shared with the one or more observed malicious entities to the one or more features shared with the one or more observed benign entities comprises comparing a number of features shared with the one or more observed malicious entities to a number of features shared with the one or more observed benign entities.

8. The method of claim 1, further comprising pre-registering the one of the unobserved entities as a malicious entity prior to receiving packets sent from the one of the unobserved entities.

9. The method of claim 1, wherein the probabilistic model comprises a Multinomial distribution and a Dirichlet distribution.

10. An apparatus, comprising:
    a network interface; and
    a processor, wherein the processor is configured to:
       collect data from a database arrangement about behavior of observed entities observed operating in a network, wherein the collected data includes one or more features associated with the observed entities;
       generate a probabilistic model that correlates the one or more features with malicious and/or benign behavior of the observed entities;
       collect data from the database arrangement for unobserved entities that have not been observed operating in the network and that have at least one common feature with at least one of the observed entities;
       generate, from the probabilistic model, a numerical confidence level that one of the unobserved entities is a malicious entity prior to receiving packets sent from the one of the unobserved entities;
       determine a numerical threshold for the probabilistic model such that a deviation of the numerical confidence level from the numerical threshold is indicative that the one of the unobserved entities is malicious;
       determine from the probabilistic model that the one of the unobserved entities is a malicious entity;
       include the one of the unobserved entities as a malicious entity on a blacklist prior to receiving the packets sent from the one of the unobserved entities; and
       apply, via the network interface, network policies to the packets sent from the one of the unobserved entities based upon the blacklist.

11. The apparatus of claim 10, wherein the processor is configured to determine an acceptable false positive rate at which the probabilistic model will falsely identify benign entities as malicious entities, and set the numerical threshold to a value to achieve the acceptable false positive rate.

12. The apparatus of claim 10, wherein the processor is configured to collect data from the database arrangement for unobserved entities by collecting data from a database of social networking data.

13. The apparatus of claim 10, wherein the processor is configured to collect data from the database arrangement for unobserved entities by collecting data from a WHOIS database.

14. The apparatus of claim 10, wherein the processor is configured to apply network policies to the packets by blocking network packets sent by the malicious entity.

15. The apparatus of claim 10, wherein the processor is configured to determine from the probabilistic model that the one of the unobserved entities is a malicious entity by:
    determining that the one of the unobserved entities shares one or more features with one or more observed malicious entities;
    determining that the one of the unobserved entities shares one or more features with one or more observed benign entities; and
    determining that the one of the unobserved entities is the malicious entity by comparing the one or more features shared with the one or more observed malicious entities to the one or more features shared with the one or more observed benign entities.

16. The apparatus of claim 10, wherein the processor is further configured to pre-register the one of the unobserved entities as a malicious entity prior to receiving packets sent from the one of the unobserved entities.

17. A tangible, non-transitory computer readable medium encoded with instructions, wherein the instructions, when executed by a processor, cause the processor to:
    collect data from a database arrangement about behavior of observed entities observed operating in a network, wherein the collected data includes one or more features associated with the observed entities;
    generate a probabilistic model that correlates the one or more features with malicious and/or benign behavior of the observed entities;
    collect data from the database arrangement for unobserved entities that have not been observed operating in the network and that have at least one common feature with at least one of the observed entities;
    generate, from the probabilistic model, a numerical confidence level that one of the unobserved entities is a malicious entity prior to receiving packets sent from the one of the unobserved entities;
    determine a numerical threshold for the probabilistic model such that a deviation of the numerical confidence level from the numerical threshold is indicative that the one of the unobserved entities is malicious;
    determine from the probabilistic model that the one of the unobserved entities is a malicious entity;
    include the one of the unobserved entities as a malicious entity on a blacklist prior to receiving the packets sent from the one of the unobserved entities; and
    apply, via a network interface, network policies to the packets sent from the one of the unobserved entities based upon the blacklist.

18. The computer readable media of claim 17, further comprising instructions that cause the processor to determine an acceptable false positive rate at which the probabilistic model will falsely identify benign entities as malicious entities, and set the numerical threshold to a value to achieve the acceptable false positive rate.

19. The computer readable media of claim 17, wherein the instructions cause the processor to determine from the probabilistic model that the one of the unobserved entities is a malicious entity by:
  determining that the one of the unobserved entities shares one or more features with one or more observed malicious entities;
  determining that the one of the unobserved entities shares one or more features with one or more observed benign entities; and
  determining that the one of the unobserved entities is a malicious entity by comparing the one or more features shared with the one or more observed malicious entities to the one or more features shared with the one or more observed benign entities.

20. The computer readable media of claim 17, wherein the instructions further cause the processor to pre-register the one of the unobserved entities as a malicious entity prior to receiving packets sent from the one of the unobserved entities.

\* \* \* \* \*